United States Patent Office 3,050,505
Patented Aug. 21, 1962

3,050,505
COPOLYMERIZATION PROCESS
Frank R. A. Litterio, East Orange, N.J., assignor to White Laboratories, Inc., Kenilworth, N.J., a corporation of New Jersey
No Drawing. Filed Sept. 6, 1960, Ser. No. 53,881
6 Claims. (Cl. 260—80.3)

This invention relates to the batchwise preparation of cross-linked copolymers, and is more particularly concerned with an improved process whereby the resins obtained are in the form of distinct, discrete, relatively uniform, small soft beads by conducting the copolymerization reaction in a hot aqueous slurry of an inorganic salt (e.g. magnesium sulfate) as the reaction media.

This invention is an improvement on the prior art methods as exemplified by Markus, U.S. Patent 2,810,716 wherein swellable resins were prepared by copolymerizing a monomer with a small amount of a cross-linking agent in the presence of an aqueous saturated magnesium sulfate solution as the reaction media and wherein the resins obtained were mostly in the form of shapeless clumps and large lumps rather than small uniformly sized beads. On a commercial scale use of the prior art method resulted in the formation in the polymerization tank of a small amount of chunks of resin several inches in diameter with the bulk of the resin being formed in a single lump of one to one and one-half feet in diameter. The formation of such lumps presented serious problems in the handling and washing of the resins. These large resin pieces would not go through exit pipes leading from the polymerization tank to the washing tank and the resin lumps had to be broken up in the polymerization tank which took sometimes as long as a week to accomplish. It required even longer periods of time, up to one month to complete the entire procedure i.e. in order to get the resin from the polymerizer to the washing tank, wash it, and into the dryer. Serious difficulties were also encountered because of heat build-up in these lumps during polymerization which tended to disrupt the uniformity of the resin. The process of the present invention avoids these difficulties and leads to a uniform product which can be completely formed and purified in less than two days. In the process of the present invention, the copolymerization reaction is conducted in the presence of an aqueous inorganic salt slurry e.g. an aqueous magnesium sulfate slurry as the reaction media. This slurry is rather thick and of a creamy consistency.

The critical difference between the present method and that shown in the Markus patent is in the use of the salt slurry as opposed to the concentrated salt solution. The use of a slurry as contrasted to use of a solution, albeit saturated, has a tremendous bearing on the ease of commercial manufacture of the materials involved. While both methods give uniform cross-linking, the resins that form by each procedure are quite different in external physical characteristics. By the slurry method, discrete beads ranging in size, depending upon agitation, baffling and ratio of monomer to slurry, from 1–2 millimeters to 10–20 millimeters are readily obtained. To appreciate the differences between the amounts of Epsom salt used in the aqueous saturated magnesium sulfate solution reaction medium of the prior art and contrasting this with the amount of Epsom salt in the slurry reaction medium of the present invention it should be noted that: at the desired reaction temperature (about 78–82 degrees centigrade) a saturated aqueous magnesium sulfate solution is made from about two and a half parts by weight of Epsom salt per part of water, while an aqueous magnesium sulfate slurry of creamy consistency is made from roughly about twenty parts by weight of Epsom salt per part of water.

The preferred reaction media is prepared by adding a hundred parts by weight of Epsom salt ($MgSO_4 \cdot 7H_2O$) to 4.8 parts of water and then stirring this while heating to a temperature of about 74–78 degrees centigrade. The agitation and heating is continued until a slurry of a creamy consistency is formed. Once this slurry has been formed, the mixture of reactants and polymerization initiators is added thereto, with continued stirring, agitation, and heating.

While Epsom salt is the preferred material and magnesium sulfate the preferred salt for use in the aqueous slurry reaction media, it should be understood that other organic salts or hydrates thereof may be used, especially those which are non-redox divalent-ion containing salts, for example: potassium sulfate, calcium chloride, secondary sodium phosphate, and salts employing combinations of anions and cations such as barium, beryllium, cadmium, calcium, carbonate, chromium, cobalt, lead, magnesium, manganese, molybdate, nickel, selenate, strontium, sulfate, tin, tungsten, zinc, etc. as discussed in the Markus patent. The amount of inorganic salt to be used per part of water in forming the slurry reaction media will vary according to the solubility of the inorganic salt in water.

Since the success of the polymerization method employed depends on the fact that the polymerizaation reaction proper takes place in discrete and separate oil-in-water droplets, the water solubility of the inorganic salt employed must be at least about half molar in order to salt out the monomer and the first formed, water-soluble polymer. Superior results are obtained with the more water-soluble inorganic salts. Moreover, these readily soluble salts are readily washed out of the finished polymer.

Prior art methods have utilized poorly soluble materails, and even clays, as suspension agents in order to get a more uniform sized and desirable resin particle. Being water-insoluble, these materials can not be washed from the completed resin and may act as irritants when the resin is used internally especially for bulk laxative, appetite depressant or similar uses. The process of the present invention does not require the use of an extrinsic suspension agent and the resultant product is not so contaminated. Due to the ready solubility of the inorganic salts employed, the washed product is obtained salt-free and in a high degree of purity.

As stated previously, the present method represents an improvement on the method of U.S. Patent 2,810,716 and is applicable to the same general type of resins mentioned and described therein. The same types of monomers, initiators and cross-linking agents may be used. While the preferred method here embraces a resin containing between 0.01 and 0.2 percent of cross-linking agent, it has been successfully accomplished on resins containing up to 1.0 percent of cross-linking agent. The method is operative with more highly cross-linked resins but such resins lose the desirable attribute of swellability characteristic of the products of the Markus patent.

It is obvious to one skilled in the art of resin preparation that there will be prefered or optimum combinations of polymerizable reactants, initiators, cross-linkers and inorganic salts. The use of Epsom salt was found to give extremely reproducible results with acrylic materials. As will be seen from the examples, the preferred process here is accomplished by adding a mixture of acrylic acid containing between about 0.16 and 0.20 percent of a cross-linking agent such as divinyl benzene or divinyl glycol (3,4-dihydroxy-1,5-hexadiene) and a small amount of conventional free-radical initiator to the hot slurry of magnesium sulfate at 74 to 78 degrees centigrade. In general, in order to get a uniform resin by this method it is critical that the reaction take place at the temperature range between about 73 and about 95 degrees centigrade, with the lower temperatures being used in the early part of the reaction and being gradually increased as the reaction progresses. Close control of the temperature is required because of the highly exothermic nature of the polymerization reaction.

The following examples are given to illustrate certain procedures of the present invention, but are not to be construed as limiting.

*Example 1*

The apparatus used was a five gallon, glass-lined Pfaudler kettle equipped with a deep anchor type agitator set to stir at 185 revolutions per minute, and having baffling means to insure complete agitation and thorough admixture of the contents. The kettle was charged with forty pounds of Epsom salt and eleven hundred and fifty milliliters of water and the contents heated at 78 degrees centigrade with continuous stirring until a thick creamy-textured slurry formed. Thereupon, four pounds (1818 grams) of acrylic acid, 18.2 milliliters of divinyl glycol (3,4-dihydroxy-1,5-hexadiene) and 5.2 grams of azo-bis-isobutyronitrile were added to the kettle reaction vessel, and the contents were then heated at 78 degrees centigrade for one hour and then at 85–95 degrees centigrade for two hours with stirring. At the end of this period the heating and stirring were discontinued, and 2 liters of water was added to the kettle, thereby dissolving all undissolved Epsom salt. The kettle contents were then filtered and the resin beads formed were washed with additional water then with methanol after which they were dried at 75 degrees centigrade. There was thus obtained 3.8 pounds (95 percent yield) of a swellable acrylic acid-divinyl glycol resin, swellable to the extent of 120 milliliters per gram in artificial intestinal juice. The resin was obtained in the form of small, soft, discrete colorless beads about 5–7 millimeters in diameter, which did not stick to each other, the sides of the kettle, agitator, or drying pans.

*Example 2*

Using the same equipment as for Example 1, 35 pounds of Epsom salt and 750 milliliters of water were mixed, heated to 78 degrees centigrade while stirring continuously until a creamy slurry was formed. To this was added a mixture of 3 pounds of acrylic acid, 13 milliliters of divinyl glycol and 4 grams of azo-bis-isobutyronitrile. The mixture was heated for one hour at 78 degrees and then for two hours at 90 degrees centigrade, while being stirred continuously. At the end of this period, heating and stirring were stopped, and 2 liters of water were added. The kettle contents were filtered and washed with additional water and with methanol. The resin was obtained in the form of rice-sized beads of almost uniform dimensions. The yield of this acrylic acid-divinyl glycol resin was 2.8 pounds (93 percent).

*Example 3*

Using a 500 milliliter round-bottomed 3-neck Pyrex flask equipped with a stirrer: 300 grams of anhydrous disodium phosphate suspended in 150 milliliters of hot water was charged into the reaction flask where it was stirred until a creamy slurry formed while being heated at 75 degrees centigrade. Then a mixture of 15 grams of 2-vinylpyridine and 150 milligrams of p-p'-diisopropenyl-diphenylmethane and 60 milligrams of azo-bis-isobutyronitrile was added to the flask. The contents were then heated at 80–90 degrees centigrade while stirring for two hours. The resin was obtained in the form of uniform fine pearls. The pearls of 2-vinylpyridine-diisopropenyl-diphenylmethane resin were washed in water, then in dilute mineral acid followed by dilute ammonia, were rinsed in water and then dried. The final yield was 14 grams (93 percent). This resin swelled in artificial gastric juice to the extent of 54 milliliters per gram.

*Example 4*

Twelve gallons of water was run into a 50 gallon jacketed kettle equipped with a deep anchor type agitator and heated to 90–95 degrees centigrade. While stirirng at temperature, 1,000 pounds of Epsom salt was gradually added in approximately 10 pound portions over a period of about 2 hours. The temperature of the creamy slurry was maintained at 78–82 degrees centigrade while a previously prepared mixture of 90 pounds of glacial acrylic acid, 133 grams azo-bis-isobutyronitrile and 78 milliliters of divinyl glycol was added over a period of 1 to 3 minutes and blended into the slurry within 5 minutes. After 15 minutes of further stirring, the temperature was raised to about 90 degrees centigrade for about 85 minutes. About 45 gallons of water at 20 degrees centigrade was added to the kettle and its contents were transferred to a washing tank. After thorough washing with 1600 gallons of water in portions, the product was allowed to drain dry. After drying in a hot air oven at 90–95 degrees centigrade, there was obtained about a 92 percent yield of resin.

The general method of this example was repeated in runs containing from 60 to 100 pounds of acrylic acid, 0.15 to 0.22 percent cross-linker, 80 to 133 grams of initiator and 800 to 1000 pounds of magnesium sulfate in 10 to 20 gallons of water.

While the process of the present invention has been described with special reference to swellable copolymers containing only a smaller percentage of the cross-linking agent, the slurry method of the present invention is also applicable to resins having a higher ratio of cross-linking agent.

Various modifications apparent to those skilled in the art may be made in the method of the present invention without departing from the spirit or scope thereof, and it is to be understood that I limit myself only as defined in the appended claims.

I claim:

1. The process of preparing cross-linked water swellable resins in the form of distinct, relatively uniformly-sized, small beads which comprises: introducing an ethylenically unsaturated monomer subject to both homo- and copolymerization, a copolymerizable diethylenically unsaturated cross-linking agent, and a polymerization initiator into a vigorously agitated, smooth aqueous slurry of a water-soluble inorganic non-redox divalent-ion containing salt maintained at about 74–78 degrees centigrade; heating the resultant admixture for about 15 minutes with agitation at about 74–78 degrees centigrate, and then heating the admixture at about 90–95 degrees centigrade with agitation until the resin has been formed as beads; discontinuing heating and agitation; washing the resin beads, and drying them.

2. The process of claim 1 wherein the inorganic salt is magnesium sulfate.

3. The process of claim 1 wherein the inorganic salt is disodium phosphate.

4. The process of preparing cross-linked water swellable resins in the form of distinct, relatively uniformly-sized, small beads which comprises: introducing acrylic acid, a copolymerizable diethylenically unsaturated cross-linking agent, and a polymerization initiator into a vigorously agitated, smooth aqueous slurry of a water-soluble inorganic, non-redox divalent-ion containing salt maintained at about 74–78 degrees centigrade; heating the resultant admixture for about 15 minutes with agitation at about 74–78 degrees centigrade with agitation until the resin has been formed as beads; discontinuing heating and agitation; washing the resin beads, and drying them.

5. In a process for obtaining a loosely cross-linked swellable resin, said resin being a copolymer of acrylic acid containing about 0.01–1.0 percent by weight of divinyl glycol as a cross-linking agent, the steps which comprise: adding 100 parts by weight of Epsom salt to about 4.8 parts by weight of water, and heating at about 74–78 degrees centigrade with vigorous agitation until a creamy-textured slurry forms; introducing acrylic acid and divinyl glycol, in amounts sufficient to form the desired resin, and a polymerization initiator into said slurry; heating the resulting admixture with constant agitation at about 78 degrees centigrade for about 15 minutes and then at about 85–95 degrees centigrade for about one and one-half hours; discontinuing heating and agitation; adding water to the admixture to dissolve all undissolved Epsom salt; and washing and drying the resultant resin which is obtained in the form of small, distinct beads.

6. In a process for obtaining a loosely cross-linked swellable resin, said resin being a copolymer of arcylic acid containing about 0.15–0.20 percent by weight of divinyl glycol as a cross-linking agent, the steps which comprise: adding 100 parts by weight of Epsom salt to about 4.8 parts by weight of water, and heating at about 74–78 degrees centigrade with vigorous agitation until a creamy-textured slurry forms; introducing acrylic acid and divinyl glycol, in amounts sufficient to form the desired resin, and a polymerization initiator into said slurry; heating the resulting admixture with constant agitation at about 78 degrees centigrade for about 15 minutes and then at about 85–95 degrees centigrade for about one and one-half hours; discontinuing heating and agitation; adding water to the admixture to dissolve all undissolved Epsom salt; and washing and drying the resultant resin which is obtained in the form of small, distinct beads.

References Cited in the file of this patent

UNITED STATES PATENTS

| 2,440,808 | Neher et al. | May 4, 1948 |
| 2,810,716 | Markus et al. | Oct. 22, 1957 |

OTHER REFERENCES

Shildknecht, Polymer Processes, Interscience (1956), pp. 69–75.